United States Patent [19]

Papalos et al.

[11] 3,981,837

[45] Sept. 21, 1976

[54] LARGE PARTICLE SIZE SYNTHETIC LATEX EMULSIFIERS

[75] Inventors: John G. Papalos, Kearny; James S. Lee, Long Valley, both of N.J.

[73] Assignee: Diamond Shamrock Corporation, Cleveland, Ohio

[22] Filed: Mar. 22, 1974

[21] Appl. No.: 453,924

Related U.S. Application Data

[63] Continuation of Ser. No. 334,849, Feb. 22, 1973, abandoned.

[52] U.S. Cl. .................... 260/29.7 SQ; 260/29.2 M; 260/29.2 TN; 260/29.2 EP; 260/29.2 UA; 260/29.2 N; 260/29.2 E; 260/29.4 R; 260/29.4 UA; 260/29.6 MQ; 260/29.6 PT; 260/29.6 T; 260/29.6 TA; 260/29.6 Z; 260/29.6 R; 260/29.7 PT; 260/29.7 T; 260/29.7 R
[51] Int. Cl.² ...................... C08F 2/26; C08L 9/04; C08L 9/08; C08L 27/06
[58] Field of Search .............. 260/29.7 SQ, 29.7 PT, 260/29.7 T, 29.6 Z, 29.6 MQ, 29.6 PT, 29.2 M, 29.2 TN, 29.2 EP, 29.2 UA, 29.2 N, 29.2 E, 29.6 T, 29.6 TA

[56] References Cited
FOREIGN PATENTS OR APPLICATIONS
961,551   6/1964   United Kingdom
976,086   11/1964   United Kingdom

*Primary Examiner*—Murray Tillman
*Assistant Examiner*—T. DeBenedictis, Sr.
*Attorney, Agent, or Firm*—Neal T. Levin; Leslie G. Nunn

[57] ABSTRACT

Large particle size synthetic latexes are produced by incorporating novel emulsifiers into the polymerization recipes. These bio-degradable emulsifiers are salts of partially mono-sulfonated mono-alkyl benzenes.

16 Claims, 1 Drawing Figure

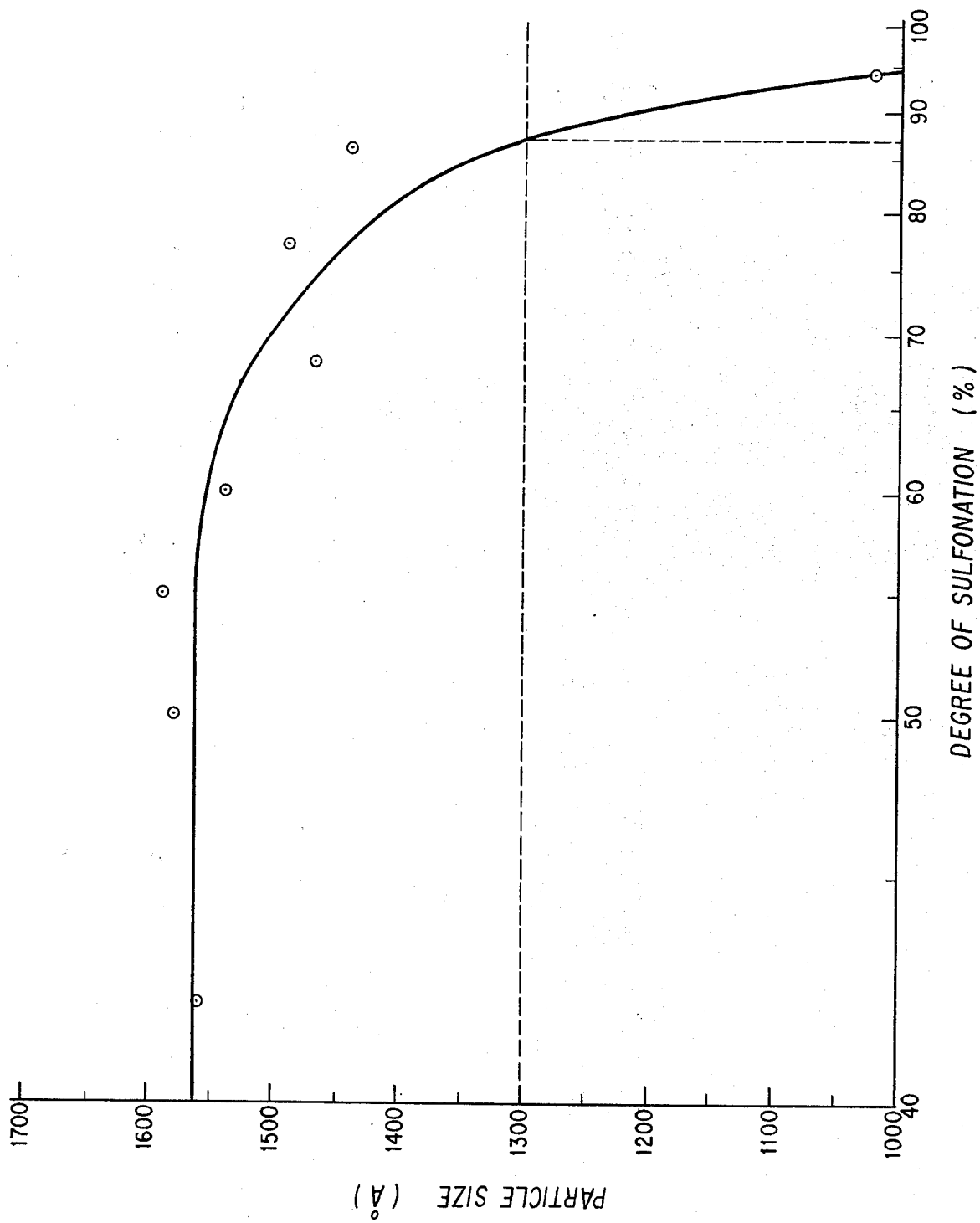

LARGE PARTICLE SIZE SYNTHETIC LATEX EMULSIFIERS

This is a continuation of application Ser. No. 334,849, filed Feb. 22, 1973, and now abandoned.

BACKGROUND OF THE INVENTION

1. Field of the Invention

This invention relates to bio-degradable sulfonated alkyl benzyl salt emulsifiers used to produce large particle size synthetic latexes. Relevant United States classes appear to be 252/337, 351, 353 and 260/505, 695.

2. Description of the Prior Art

Alkyl benzyl sulfonates and their salts are generally well known in the prior art as emulsifiers.

U.S. Pat. No. 2,130,326 discloses sufonated alkylaromatic emulsifiers.

U.S. Pat. No. 2,161,173 discloses sulfonated alkylaromatic wetting agents.

U.S. Pat. No. 2,195,409 discloses the use of alkylaromatic sulfonates in electroplating baths.

U.S. Pat. No. 2,232,117 discloses mono-sulfonated alkyl benzenes as wetting agents.

U.S. Pat. No. 2,283,199 discloses the preparation of detergent alkylaromatic sulfonates. Although there appears to be a disclosure of a relation between degree of sulfonation and detergent properties, this patent actually refers to the degree of disulfonation compared to monosulfonation. This interpretation of the disclosure is based upon the facts that: (1) all of the products of this patent are water soluble (unsulfonated alkyl benzenes are not) and (2) alkyl dicyclics are used as starting materials, which is more likely to result in disulfonation.

U.S. Pat. No. 2,463,497 discloses alkyl aryl sulfonates as wetting agents.

U.S. Pat. No. 2,604,467 discloses alkyl benzene sulfonates used as latex emulsifiers to produce latexes of high concentration.

U.S. Pat. No. 2,719,785 discloses alkyl benzene sulfonates in herbicidal emulsions.

U.S. Pat. No. 2,845,407 discloses oxidized alkyl benzene sulfonates as initiators in emulsion polymerization recipes.

U.S. Pat. No. 3,617,207 discloses $C_{6-9}$ alkyl benzene sulfonates as wetting agents.

No prior art was found which relates the degree of sulfonation of an alkyl benzene emulsifier to the viscosity or particle size of a synthetic latex.

SUMMARY OF THE INVENTION

It has unexpectedly been discovered that the degree of sulfonation of a mono-alkyl benzene sulfonate salt primary emulsifier will determine the particle size of a synthetic latex in which it is used. As used throughout this patent, the term "degree of sulfonation" always means the ratio of the amount of actual sulfonation to the theoretical maximum sulfonation, as calculated by molecular weights. The use of alkyl aryl sulfonates as emulsifiers for synthetic latexes is well known. However, as used in the prior art, the alkyl aryl moieties are completely monosulfonated or are disulfonated. A completely sulfonated alkyl aryl sulfonate emulsifier will produce a high viscosity, small particle size, synthetic latex. By reducing the degree of sulfonation, it has been found possible to reduce the viscosity and increase the particle size of the synthetic latex. The relationship between particle size and degree of sulfonation was found not to be linear, as had been expected. The graph clearly shows that there is a critical maximum degree of sulfonation of between about 60 and 87% after which the particle size rapidly decreases. A particle size of less than 1,300 A is considered undesirable for blended mixtures (see infra).

The minimal degree of sulfonation is less easily determined. When the degree of sulfonation falls below about 35%, the surface-active qualities of the emulsifier are apreciably lessened so that the latex polymerization is inhibited. Furthermore, the polymerization stability decreases with the decrease in degree of sulfonation, and when it falls below about 35%, coagulum levels become excessive. Thus, the degree of sulfonation of the alkyl benzene sulfonate should be between 35% and 87% and preferably 40 to 85% to achieve the largest particle size, stable emulsion. Although the graph discussed above is based upon a blend of sulfonated and unsulfonated alkyl benzene salts, a similar curve is obtained when the emulsifier is produced by partial oleum or dry gas sulfonation of an alkyl benzene. The essential difference between these curves and the graph is that there is an almost uniform upward displacement. That is, larger particle size latexes are formed for all degrees of sulfonation except 94%, but the critical break in the curve occurs at about the same points.

The salts of sulfonated alkyl benzenes may be produced either by blending mono-sulfonated and unsulfonated mono-alkyl benzenes or, preferably, by mono-sulfonation of mono-alkyl benzene under conditions such that the sulfonation is incomplete. A more nearly mono-dispersed large particle size latex is achieved by partial sulfonation rather than blending.

An important aspect of this invention is that the emulsifiers are bio-degradable.

Evaluation of the particle size of latexes using completely sulfonated alkyl benzene salts as primary emulsifiers indicates that the largest particle size latexes that can be obtained average about 750 A, and that the addition of an electrolyte and the use of specialized polymerization techniques can produce a latex of average particle size up to about 1,500 A.

In sharp contrast, the use of the primary emulsifiers of this invention when prepared by simple blending can produce a latex of average particle size up to about 1600 A, and with the addition of an electrolyte and the use of specialized polymerization techniques up to about 2200 A. Furthermore, the use of the primary emulsifiers of this invention when prepared by partial sulfonation can produce a latex of average particle size up to about 1,800 – 2,200 A, and with the addition of an electrolyte and the use of specialized polymerization techniques up to about 3,500 A.

DESCRIPTION OF THE DRAWING

The graph shows the relationship between the average latex particle size (Angstroms) and the degree of sulfonation (percent) of the alkyl benzyl sulfonate salt, used in a standard latex recipe without any electrolyte present.

The curve was plotted on a semi-logarithmic scale in order to illustrate the critical maximum degree of sulfonation more clearly. The data for this graph was obtained from emulsifiers consisting of blends of sulfonated dodecyl benzene sodium salts with unsulfonated dodecyl benzene. The sulfonated dodecyl benzene sodium salt has a 94% degree of sulfonation and when used by itself gave an average particle size of 1,020 A. The actual numerical values for the points upon which the curve is based are as follows.

Table I

| average particle size (A) | degree of sulfonation (%) |
|---|---|
| 1,560 | 42 |
| 1,580 | 50 |
| 1,590 | 55 |
| 1,540 | 60 |
| 1,470 | 68 |
| 1,490 | 77 |
| 1,440 | 86 |
| 1,020 | 94 |

DESCRIPTION OF THE PREFERRED EMBODIMENTS

1. Compositions

The alkyl benzene sulfonate salts useful in this invention are as follows.

The alkyl moiety must be linear, have from 6 to 20 carbon atoms, and may be saturated or unsaturated. Alkyl moieties having 10 to 16 carbon atoms are preferred while saturated alkyl moieties having 10 to 16 carbon atoms are most preferred. Alkyls that are branched chain are not useful in this invention only because they are not sufficiently bio-degradable.

The only substitutions desired on the benzene ring are one of the above alkyl moieties attached terminally and a sulfonate moiety. As a practical matter, there will always be some dialkyl benzene produced in the benzene alkylation process, but this undesirable impurity will not affect the composition when present in small amounts. Polyphenyls, fused rings, phenols, anilines, and similar aromatics are not useful in this invention.

The useful salt moieties are those which are monovalent and positive and include those of lithium, potassium, sodium, and ammonium. Sodium and potassium salts are preferred.

Alkyl benzenes of the type described above are well known in the art and can be made, for example, by a Friedel-Crafts reaction of benzene with kerosene-derived n-alkyl chlorides. They are usually available only as mixtures with varying alkyl chain lengths.

The degree of sulfonation of the alkyl benzene is critical in two respects. Firstly, the molecules must be monosulfonated, that is, not more than one $SO_3$ moiety may be added to the benzene ring. The $SO_3$ moiety will usually be in the para position to the alkyl moiety although up to about 20% ortho sulfonates may be formed. Due to the sulfonation processes that may be employed, there will always be a trace of disulfonates, sulfones and dimers. Although these impurities are undesirable, they will not affect the composition when present in small amounts. Secondly, the sulfonation must be incomplete. That is, the degree of sulfonation must be between about 35 and 87%, preferably between about 40 and 85% and most preferably between about 40 and 75%. The degree of sulfonation remains constant within the above parameters regardless of the size of the alkyl moiety although, of course, the physical amount of $SO_3$ used for a given amount of alkyl benzene wll be lower for the higher alkyls and higher for the lower alkyls.

All of the evaluations of the primary emulsifiers of this invention were in conjunction with a standard synthetic latex recipe. This standard recipe contains a diluent, a primary emulsifier, an initiator, and at least one synthetic latex monomer, with optionally, a chelating agent, an electrolyte, a heat transfer agent, and a secondary emulsifier. The amounts of recipe ingredients are all in parts by weight based upon 100 parts by weight of the synthetic latex monomer. Suitable monomers are those that can be used in emulsion polymerization latexes, especially those that are relatively water insoluble, including acrylonitrile, butadiene, Vinylchloride, styrene, and the like. An example of a typical recipe would be:

| ingredient | function | parts by weight |
|---|---|---|
| water | diluent and heat transfer agent | 110.0 |
| composition of Example I | primary emulsifier | 1.5 |
| $Na_2SO_4$ | electrolyte | 0.4 |
| EDTA | chelating agent | 0.1 |
| $K_2S_2O_8$ | initiator | 0.2 |
| substituted mercaptan | chain transfer agent | 0.5 |
| styrene | latex monomer | 65.0 |
| butadiene | latex monomer | 35.0 |

2. Manufacturing Processes a. Blending - The emulsifiers of this invention may be made by thoroughly blending sulfonated alkyl benzene salts and unsulfonated alkyl benzenes so that the mixture has the desired average degree of sulfonation. For example, to achieve an 80% average degree of sulfonation mixture, one could blend 0.20 moles of unsulfonated material with 0.80 moles of sulfonated material having a 100% degree of sulfonation. Alternatively, one could blend 0.11 moles of unsulfonated material with 0.89 moles of sulfonated material having a 90% degree of sulfonation, etc. It is not necessary that the alkyl moieties of the two blended materials be the same, although that is preferred. Similarly, the two materials themselves may each be mixtures of differing alkyl moieties. The data in the "Description of the Drawing", supra, is based upon blends of dodecyl benzene and sulfonated dodecyl benzene sodium salt having a 94% degree of sulfonation. Although the above alkyl groups are named "dodecyl" for convenience, they actually are blends of $C_{10-16}$ alkyls having an average of twelve carbon atoms.

b. Partial Sulfonation - The emulsifiers of this invention may also be made by using any known sulfonation process suitable for an alkyl benzene. It is, of course, critical that sulfonation not be complete and that the degree of sulfonation be within the ranges mentioned previously. Any of the alkyl moieties mentioned previously, or mixtures thereof, may be employed in the alkyl benzene starting material. Sulfonation processes include, but are not limited to, those using sulfuric acid 98%, various strengths of oleum, $SO_3$ vapor, and $SO_3$ dissolved in $SO_2$. An example of oleum sulfonation is as follows (all parts are by weight).

EXAMPLE I

Dodecyl benzene sulfonate sodium salt manufactured by partial oleum sulfonation 19.4 parts of dodecyl benzene ($C_{10-16}$ alkyl, averaging $C_{12}$) was charged under a nitrogen atmosphere into a reactor. 12.2 parts of oleum 20% (20% fuming $H_2SO_4$) was slowly added with fast stirring over a period of 4 hours, while the temperature of the reaction mass was kept at 20° – 30°C. (The reaction is exothermic). After all of the oleum 20% was added, the reaction mass was stirred for an additional 1-½ hours and then stored overnight. A bottom layer of 2.4 parts of spent acid ($H_2SO_4$) was then removed and discarded. The resulting acidic reaction mass (29.2 parts) was then added to 58.5 parts of water accompanied by fast stirring and cooling at 20°-35°C. The acid reaction mass was then neutralized by the addition of about 12.3 parts of sodium hydroxide 50% solution. The sodium hydroxide solution was diluted to 25% just before neutralization and approximately 70% of the dilute solution was added at 20°-35°C accompanied by fast stirring. The remaining sodium hydroxide solution was then added until the desired pH was reached. The desired pH of a 5% solution of the salt was 9 – 9.5. Solids were determined to be 33 ± 2%. The composition was a clear yellow liquid with a Gardener color of <12.0. The degree of sulfonation was about 57%. This compound was an emulsifier within the scope of this invention.

3. Evaluation of other factors in producing large particle size latexes a. Electrolytes - In order to ascertain whether electrolytes used in latex recipes are responsible for the increased particle size, the folowing tests were run.

Electrolyte content - The electrolyte content was varied in a standard recipe using sodium dodecyl benzyl sulfonate, having a 50% degree of sulfonation. The electrolyte used was sodium sulphate. Because of the extensive laboratory work required to determine the actual particle size, the comparative data is given in terms of turbidity as measured on a photoelectric colorimeter and in viscosity as measured in centipoises. Turbidity increases in direct relationship to particle size and therefore forms a proper basis for such comparative data. A lower viscosity formulation will generally, but not always, produce a larger particle size latex. All quantities are parts by weight per 100 parts by weight of monomer.

Table II

| Electrolyte | Turbidity | Coagulum | Viscosity |
|---|---|---|---|
| — | 394 | 0.167 | 1600 |
| 0.050 | 384 | 0.417 | 250 |
| 0.1225 | 371 | 0.750 | 277 |
| 0.1950 | 419 | 1.000 | 105 |
| 0.2675 | 428 | 0.333 | 80 |
| 0.340 | 443 | 0.222 | 58 |
| 0.4125 | 447 | 1.250 | 44 |
| 0.4850 | 515 | 0.833 | 36 |

The above results indicate that an increased amount of electrolyte will produce a larger particle size latex, but usually accompanied by an increase in coagulum. The increase in coagulum makes the use of large amounts of electrolyte unfeasible.

A series of tests were run comparing the turbidities of latexes using different batches of emulsifiers within the scope of this invention and a commercial emulsifier outside the scope of this invention, with varying electrolyte levels and amounts of emulsifier.

Table III

| | Emulsifier (Degree of Sulfonation) | Amount | Electrolyte Level | Turbidity |
|---|---|---|---|---|
| 1 | 94%[1] | 2.0 | 0.4 | 260 |
| 2 | 50[2] | 1.5 | — | 495 |
| 3 | 50[2] | 1.5 | 0.6 | 508 |
| 4 | 94[1] | 1.5 | — | 252 |
| 5 | 94[1] | 1.5 | 0.6 | 315 |
| 6 | 50[2] | 1.5 | — | 497 |
| 7 | 50[3] | 1.5 | — | 497 |
| 8 | 50[3] | 1.5 | 0.6 | 558 |
| 9 | 50[4] | 1.5 | — | 500 |
| 10 | 50[4] | 1.5 | 0.6 | 535 |

[1] A commercial latex emulsifier which is a dodecyl benzene sulfonate which analytical analysis showed to have a 94% degree of sulfonation, sold by Pilot Chemical Company, Los Angeles, California under the trademark "Calsoft LAS 99".
[2] The emulsifier of Example I prepared in the laboratory, after about 7 months of storage.
[3] The emulsifier of Example I freshly prepared in the laboratory.
[4] The emulsifier of Example I prepared in a pilot plant.

Based upon the above data, the following observations were noted.

1. The emulsifiers of this invention consistently produced a larger particle size latex than that of the commercially available product.
2. The emulsifiers of this invention showed great stability.
3. The emulsifiers of this invention could be produced in commercial quantities with the same efficacy as if produced in the laboratory.
4. An increase of the amount of the commercially available product decreased the latex particle size, presumably due to the increased amount of sulfonate present.
5. A consistently larger particle size is obtained when electrolyte is present, regardless of the emulsifier used.

From the above, is was concluded that the electrolyte content affected the particle size independently of the emulsifier.

A series of tests were then run to ascertain whether the choice of electrolyte affected the particle size. Comparisons were made using equal amounts of sodium sulphate, trisodium phosphate, tetrasodium pyrophosphate, tripolyphosphate and sodium acid pyrophosphate. No appreciable difference in turbidity was noted.

From all of the above, it was concluded that the increase in particle size using the emulsifiers of this invention was independent of the electrolyte.

b. Manufacturing Process - As indicated previously, a partial sulfonation process emulsifier yields larger particle size latexes than one produced by blending. In order to ascertain whether the method of blending was a factor, the following series of tests were conducted.

Emulsifiers with varying degrees of sulfonation, but all within the scope of this invention, were blended both using normal stirring and using a high speed blendor. The viscosities and turbidities of latexes prepared using these emulsifiers were then determined as follows.

Table IV

| | Emulsifier (Degree of Sulfonation) | Blending Method | Viscosity | Turbidity |
|---|---|---|---|---|
| 1 | 86% | normal stirring | 1525 | 435 |
| 2 | 86 | high speed blendor | 2540 | 350 |
| 3 | 68 | normal stirring | 310 | 505 |
| 4 | 68 | high speed blendor | 330 | 530 |
| 5 | 50 | normal stirring | 165 | 530 |
| 6 | 50 | high speed blendor | 142 | 540 |

From the above data, it was concluded that the blending method did not affect the efficacy of the emulsifier. It should be noted that the emulsifier with 86% degree of sulfonation gave a noticeably higher viscosity (small particle size) latex than the others, indicating that it was close to the upper limit of degree of sulfonation.

c. Amount of Emulsifier - In order to evaluate the influence of the amount of emulsifier used on latex stability (coagulum) and particle size (turbidity) the following tests were run.

Table V

| | Amount of Emulsifier | Turbidity | Coagulum |
|---|---|---|---|
| 1 | 1.5 parts | 520 | 0.333 |
| 2 | 2.0 | 480 | 0.767 |
| 3 | 2.5 | 480 | 0.833 |
| 4 | 3.0 | 455 | 0.833 |
| 5 | 3.5 | 435 | 0.833 |
| 6 | 4.0 | 435 | 0.700 |

The emulsifier used was that of Exmaple I. From the above, it was concluded that the optimum amount of emulsifier was about 1.5 parts (by weight per 100 parts by weight of latex monomers), although amounts of from about 0.5 parts to about 4.0 parts could be used. This conclusion was based upon a decrease in turbidity and an increase in coagulum.

d. Comparisons with Competitive Emulsifiers - In addition to Table III, comparative tests were run using three commercially available dodecyl alkyl benzene sulfonates, all of which were sulfonated to a high degree by their manufacturers. The results of these tests are as follows.

Table VI

| Emulsifier (2.0 parts) | Method and Degree of Sulfonation | Electrolyte Level | Turbidity |
|---|---|---|---|
| 1 Calsoft LAS99 | SO$_3$ vapor (94%) | — | 218 |
| 2 Calsoft LAS99 | SO$_3$ vapor (94%) | 0.6 | 254 |
| 3 Conoco C-550 | oleum *(118%) | — | 233 |
| 4 Conoco C-550 | oleum *(118%) | 0.6 | 276 |
| 5 Conoco C-560 | SO$_3$ vapor (91%) | — | 216 |
| 6 Conoco C-560 | SO$_3$ vapor (91%) | 0.6 | 291 |

*higher than 100% because of the presence of disulfonates
"Conoco" is a trademark of Conoco Chemical Company, New York, New York used for dodecyl benzene sulfonates.

The low turbidities for all of the above indicate that they are all inferior to the compositions of the subject invention for the purpose of producing large particle size latex. The latex recipe used was identical to that used in Table IV, and comparison should be made with test 2 of that table, which used an identical amount of the emulsifier of Example I.

Additional comparative tests were run with blends of sulfonated materials which were outside the scope of this invention.

Table VII

| | Emulsifier (totalling 1.5 parts) | | | Viscosity (centipoise) | Turbidity |
|---|---|---|---|---|---|
| | Example I | * | Nalkylene 500 | | |
| 1 | — | 1.5 | — | 2,850 | 305 |
| 2 | — | 1.1 | 0.4 | 2,750 | 325 |
| 3 | — | 0.75 | 0.75 | 1,950 | 336 |
| 4 | — | 0.4 | 1.1 | 1,250 | 418 |
| 5 | 1.5 | — | — | 52 | 488 |

*alkyl diphenyl ether disulfonate, a commercially available latex emulsifier
"Nalkylene" 500 is a trademark of Conoco Chemical Co., New York, New York and is an unsulfonated dodecyl benzene.

From the above viscosity and turbidity data, it appears that dialkyl diphenyl ether is not an efficacious substitute for the alkyl benzene moieties of the blended compositions of this invention.

Table VIII

| | Emulsifier (totalling 1.5 parts) | | | Turbidity |
|---|---|---|---|---|
| | Example I | Sellogen HR90 | Nalkylene 500 | |
| 1 | — | 1.5 | — | 386 |
| 2 | — | 1.1 | 0.4 | 458 |
| 3 | — | 0.75 | 0.75 | 603* |
| 4 | — | 0.4 | 1.1 | ** |
| 5 | 1.5 | — | — | 520 |

*sample was badly flocculated and not usable
**did not polymerize
"Sellogen HR90" is a trademark of Diamond Shamrock Corporation, Cleveland, Ohio, and consists of a dialkyl naphthalene sulfonate.

From the above turbidity data it is apparent that dialkyl naphthalene is not an efficacious substitute for the alkyl benzene moieties of the blended compositions of this invention.

We claim:
1. In the process of manufacturing synthetic latexes, using a recipe containing a diluent, an emulsifier, an initiator, and at least one relatively water insoluble latex monomer, with optionally, a chelating agent, an electrolyte, a chain transfer agent, and a secondary emulsifier, the improvement comprising forming large particle size latexes by using in the recipe from about 0.5 to 4.0 parts by weight, based on 100 parts by weight of latex monomers, of a primary emulsifier system comprising a. from about 35 to about 87% by weight of a salt of a mono-alkyl benzene mono-sulfonate, and b. the balance being mono-alkyl benzene wherein the alkyl moiety is linear, saturated or unsaturated and has from about 6 to about 20 carbon atoms.

2. The process of claim 1 wherein the primary emulsifier system is prepared by blending the salt of the mono-alkyl benzene mono-sulfonate with the mono-alkyl benzene.

3. The process of claim 1 wherein the emulsifier system is prepared by partially sulfonating the mono-alkyl benzene.

4. The process of claim 1 wherein there is present from about 40 to about 85% by weight of the salt of the mono-alkyl benzene monosulfonate in the primary emulsifier system.

5. The process of claim 1 wherein there is present from about 40 to about 75% by weight of the salt of the mono-alkyl benzene monosulfonate in the primary emulsifier system.

6. The process of claim 1 wherein the alkyl moiety has from about 10 to about 16 carbon atoms.

7. The process of claim 1 wherein the alkyl moiety is saturated.

8. The process of claim 1 wherein the salt of the mono-alkyl benzene mono-sulfonate is a sodium or potassium salt.

9. The process of claim 8 wherein there is present from about 40 to about 75% by weight of the sodium salt of dodecyl benzene sulfonate in the primary emulsifier system.

10. The process of claim 1 wherein the latex monomer is selected from the group consisting of acrylonitrile, butadiene, vinylchloride and styrene.

11. The process of claim 1 wherein the latex monomers are butadiene and styrene.

12. In a large particle size synthetic latex emulsion obtained from polymerization of at least one relatively water insoluble latex monomer in the presence of diluent, emulsifier, and initiator, with optionally, chelating agent, electrolyte, chain transfrer agent, and secondary emulsifier, the improvement comprising the presence of, per 100 parts by weight of said latex monomer, from about 0.5 to about 4.0 parts by weight of a primary emulsifier system comprising a. from about 35 to about 87% by weight of a salt of a mono-alkyl benzene mono-sulfonate, and b. the balance being mono-alkyl benzene wherein the alkyl moiety is linear, saturated or unsaturated and has from about 6 to about 20 carbon atoms.

13. The synthetic latex emulsion of claim 12 wherein the alkyl moiety has from about 10 to about 16 carbon atoms.

14. The synthetic latex emulsion of claim 12 wherein there is present from about 40 to about 75% by weight of the sodium salt of dodecyl benzene sulfonate in the primary emulsifier system.

15. The synthetic latex emulsion of claim 12 wherein the latex monomer is selected from the group consisting of acrylonitrile, butadiene, vinylchloride and styrene.

16. The synthetic latex emulsion of claim 12 wherein the latex monomers are butadiene and styrene.

* * * * *